US011032675B2

(12) United States Patent
Ylönen et al.

(10) Patent No.: US 11,032,675 B2
(45) Date of Patent: Jun. 8, 2021

(54) ELECTRONIC ACCESSORY INCORPORATING DYNAMIC USER-CONTROLLED AUDIO MUTING CAPABILITIES, RELATED METHODS AND COMMUNICATIONS TERMINAL

(71) Applicant: AINA Wireless Finland Oy, Salo (FI)

(72) Inventors: Juha Ylönen, Aura (FI); Pasi Auranen, Salo (FI)

(*) Notice: Subject to any disclaimer, the term of this patent is extended or adjusted under 35 U.S.C. 154(b) by 0 days.

(21) Appl. No.: 16/311,866

(22) PCT Filed: Jun. 12, 2017

(86) PCT No.: PCT/FI2017/050434
§ 371 (c)(1),
(2) Date: Dec. 20, 2018

(87) PCT Pub. No.: WO2017/220856
PCT Pub. Date: Dec. 28, 2017

(65) Prior Publication Data
US 2019/0200175 A1    Jun. 27, 2019

Related U.S. Application Data

(60) Provisional application No. 62/353,815, filed on Jun. 23, 2016.

(51) Int. Cl.
*H04W 4/10* (2009.01)
*H04M 3/56* (2006.01)
(Continued)

(52) U.S. Cl.
CPC ............. *H04W 4/10* (2013.01); *G06F 3/165* (2013.01); *G08B 6/00* (2013.01); *H04B 1/401* (2013.01);
(Continued)

(58) Field of Classification Search
CPC ............. H04M 1/6041; H04M 1/6058; H04M 1/6066; H04M 1/72527; H04M 1/7253;
(Continued)

(56) References Cited

U.S. PATENT DOCUMENTS

| 2014/0057574 A1* | 2/2014 | Tealdi | ............ H04B 1/44 455/69 |
| 2015/0012270 A1 | 1/2015 | Reynolds | |
| 2015/0133200 A1* | 5/2015 | Qu | ............ H04M 1/6033 455/569.1 |

FOREIGN PATENT DOCUMENTS

WO    2016027008 A1    2/2016

OTHER PUBLICATIONS

Philips, Philips Wireless Portable Speaker, SB7100 (leaflet), [online], Jul. 18, 2014, [retrieved on Sep. 11, 2014]. Retrieved from <http://download.p4c.philips.com/files/s/sb7100_05/sb7100_05_pss_engie.pdf>, 3 pages.

* cited by examiner

*Primary Examiner* — Tu X Nguyen
(74) *Attorney, Agent, or Firm* — Meunier Carlin & Curfman LLC

(57) ABSTRACT

Electronic accessory device capable of dynamically muting the microphone and/or speaker responsive to predefined user control input, and a communications terminal at least functionally connected to the accessory for the transfer of audio signals and related signaling. Related methods for execution by the accessory and the terminal are presented.

14 Claims, 5 Drawing Sheets

(51) Int. Cl.
*H04W 76/00* (2018.01)
*H04N 7/14* (2006.01)
*H04L 12/18* (2006.01)
*H04M 1/724* (2021.01)
*H04M 1/72412* (2021.01)
*G06F 3/16* (2006.01)
*G08B 6/00* (2006.01)
*H04B 1/401* (2015.01)
*H04L 5/16* (2006.01)
*H04M 1/60* (2006.01)
*H04L 12/58* (2006.01)

(52) U.S. Cl.
CPC ............ *H04L 5/16* (2013.01); *H04L 12/1822* (2013.01); *H04M 1/6033* (2013.01); *H04M 1/724* (2021.01); *H04M 1/72412* (2021.01); *H04M 3/568* (2013.01); *H04N 7/147* (2013.01); *H04W 76/00* (2013.01); *H04L 51/10* (2013.01); *H04M 1/6041* (2013.01); *H04M 3/563* (2013.01); *H04M 2203/5072* (2013.01); *H04M 2250/02* (2013.01); *H04N 2007/145* (2013.01); *H04R 2430/01* (2013.01)

(58) Field of Classification Search
CPC .... H04R 2420/07; H04R 1/1041; H04R 3/12; H04R 1/2811; H04R 1/406; H04R 2227/003; H04R 2430/01; H04R 2499/11; H04R 29/001; H04R 29/002; H04R 3/005
See application file for complete search history.

ELECTRONIC ACCESSORY INCORPORATING DYNAMIC USER-CONTROLLED AUDIO MUTING CAPABILITIES, RELATED METHODS AND COMMUNICATIONS TERMINAL

PRIORITY

This application is a U.S national application of the international application number PCT/FI2017/050434 filed on Jun. 12, 2017 and claiming priority of US provisional application U.S. 62/353,815 filed on Jun. 23, 2016, the contents of both of which are incorporated herein by reference.

FIELD OF THE INVENTION

Generally the present invention pertains to communication technology enabling voice communication between remote parties.

Especially, however not exclusively, the present invention relates to an electronic accessory device capable of dynamically muting the microphone and/or speaker thereof responsive to predefined user control input, and a communications terminal at least functionally connected to the accessory for the transfer of audio signals and related signaling. Related methods for execution by the accessory and the terminal are provided.

BACKGROUND

During the past few years, various computing platform and especially mobile platform-based communication applications have hit the software market. For instance, Google Hangouts/Voice™, Microsoft Skype™, and Facebook Work Chat/Messenger™ and various further, typically VoIP (Voice over IP) based communication solutions, have gained in popularity while more traditional circuit switched calls and different teleconferencing solutions still continue having a wide coverage and a vast if not ever increasing number of users.

In contrast to half duplex or push-to-talk (PTT)/push-to-talk over cellular (PoC) solutions wherein there is and can be only one party speaking or generally transmitting at a time to the remaining parties of a communication session or a communication group, the majority of contemporary communication solutions effortlessly offer full duplex mode to the users meaning that several users may simultaneously speak while still hearing what the remote party or parties are saying. There's no need to first reserve transmission capacity by PTT or similar transmission channel reserving or securing operation, which would, besides, add to the communication delay during switchovers between speakers.

However, it has been found that typical full duplex type communication where several participants simultaneously transmit and receive audio data using their terminals such as mobile terminals, other portable terminals, in-vehicle terminals or e.g. ordinary desktop computers is anything but trouble-free in a variety of somewhat common use scenarios.

For example, when one or more participants of are located in a noisy environment, optionally in a commercial site, industrial plant or a vehicle, the ambient noises will be likely captured by the terminal devices to at least some extent despite the potential application of directional microphones or noise-cancelling techniques, and then forwarded to the remote participants, which is generally disturbing and confusing to each listening recipient causing both fatigue and misinterpretations, and ultimately prolongs the overall discussion and related speeches due to unnecessary repetition and explanations.

Additionally, in some use scenarios a participant might simply prefer preserving privacy as to the local sound scenery, which could unpleasantly reveal his/her whereabouts to the remote parties or e.g. local conversations between him/her and other near-by persons while still attending the ongoing communication session e.g. in a more passive or dominantly a listener role.

Traditional mute button or generally muting feature provided in some full duplex communication arrangements and applications has turned out sub-optimum in a sense its usage may be awkward and the toggling procedure associated therewith may take surprisingly long time due to related signaling, software procedures and possibly clumsy UI (user interface) features assigned for the task. The delay may be about one second or even considerably more, during which the user is not absolutely certain whether the local microphone is really muted or not. This switching delay adds to the communication delay perceived during transitions between different speakers and comments. Still, traditional mute functionality may very easily unintentionally remain in wrong position.

Voice activity detection (VAD) based solutions, voice-operated switch (VOX) based solutions and other possible automated control methods of sound muting/transmission are problematic as well as they cannot reliably classify various speech-reminiscent and loud enough audio signals to the ones that are really intended for transmission and the rest that should be nothing but muted. The solutions may occasionally quite reliably separate background noise portions from higher volume, likely speech portions, but even that adds to the overall processing delay and therefore also speech delay of the system.

Likewise, in some scenarios audible reproduction of a received, far-end originating, audio signal via a (loud) speaker of a local terminal may require immediate muting. For instance, the nature of the audio signal, such as speech signal, may be such that e.g. in terms of privacy it should not be reproduced via the speaker. Additionally, there may be something going on locally that requires the local user's full attention including hearing capacity, whereupon the speaker should be immediately muted. This may be common e.g. in law enforcement, security and various other emergency scenarios wherein the person carrying the terminal should be able to immediately understand what e.g. a person locally approaching him/her says and react accordingly.

Traditionally, muting of the speaker output has been performed by turning the volume manually down by a rotatable knob or buttons, for instance, or by simply temporarily disconnecting the call or other ongoing communication session, which are both annoying and time-consuming options.

SUMMARY

It is therefore an objective of various embodiments of the present invention to at least alleviate one or more aforereviewed drawbacks related to the prior art solutions in which, from the standpoint of a local user, either uplink (sent towards the remote party/parties typically via at least one communication network) and/or downlink (towards the local user) audio signals should be dynamically controlled in terms of e.g. transmitted audio content or reproduction parameters such as timing and/or volume, respectively.

Thereby in one aspect, an electronic accessory, such as an RSM (remote speaker microphone) or a speakerphone, for a communications terminal, e.g. a smartphone, other portable or in-vehicle terminal apparatus, which is preferably operable in a communications network such as a cellular network and/or the Internet, comprises a microphone for capturing the voice of a local user preferably operating the accessory and the terminal, a communication interface, such as Bluetooth and/or Bluetooth Low Energy compliant transceiver, or other wireless or wired transceiver, for transmitting audio signals including signals based on the captured voice to the terminal, and preferably also for obtaining audio signals therefrom for audible reproduction by the accessory, a preferably momentary push-to-talk (PTT) switch for detecting the local user's explicit intent to provide voice input that is to be captured and delivered to one or more remote participants of ongoing full duplex type communication session, such as a one-on-one call or a group (conference) call respectively, via the terminal, and control circuitry, such as at least one microcontroller, a signal processor or a microprocessor, configured to mute, by default, the outgoing audio signal transmitted, wherein responsive to the actuation of the PTT switch by the local user said muting is temporarily overridden and the transfer of audio signal indicative of the captured voice signal of the local user thereby enabled, and responsive to a subsequent release of the PTT switch or detection of the occurrence of some other predefined (selected) triggering event, the muting function is reactivated.

In various embodiments, muting may incorporate transmitting a substantially silent, or silence indicating, audio signal from the accessory to the terminal via the communication interface. The audio signal may be a silence-indicating special signal or basically an ordinary audio signal with e.g. similar source encoding method than employed with unmuted speech. For example, volume or amplitude values transmitted may just be substantially zeroed for the muting purpose. The terminal may be configured to then provide the silence-indicating audio signal forward either as is or in modified form. Depending on the nature of the communication session, e.g. DTX (discontinuous transmission) transmission mode may be activated. This may take place e.g. in a cellular network during a voice call. A SID frame (Silence Insertion Descriptor) frame may be transmitted.

In various embodiments, the accessory may comprise a speaker configured to output sound including e.g. the reproduced voice signals of said one or more remote participants based on audio signals received via the terminal over the communication interface, at least one proximity sensor to detect an obstacle in the monitored volume preferably upon the speaker and/or at least in the vicinity of the speaker and optionally of the at least one sensor, responsive to which control circuitry of the accessory is configured to substantially mute the audio output via the speaker.

A proximity sensor may be positioned close, optionally adjacent to or nested with the speaker element(s), for example. Accordingly, positioning a hand, arm or other object on the speaker, or generally the motion of the object (e.g. direction), may be detected.

In various embodiments, a proximity sensor may include at least one element selected from the group consisting of: optical sensor, infrared sensor, ultrasound sensor, capacitive sensor, and inductive sensor. A proximity sensor may generally include a field or signal transmitter and a detector for sensing the field or return signal properties.

In some embodiments, the accessory may contain a plurality of proximity sensors. They may be mutually similar or different.

In some embodiments, the signal(s) by the proximity sensor(s) may be additionally or alternatively applied to determine more versatile control input by the user.

Certain input may be converted into a corresponding control signal of predefined type according to the stored mapping data or mapping logic, for example, which is associating control input gestures with control signals. In control input determination, e.g. the direction of the movement of the user's hand, finger or other feature may be detected by the sensor signal(s). The control signal may be configured to adapt an internal functionality of the accessory, e.g. speaker volume, or it may be provided via the communication interface to the terminal for controlling a functionality thereat, such as a communication application and/or even a more remote feature, such as (communication) service or server feature, at a distance from the terminal but signaling-wise reachable via a network interface of the terminal, for example.

The speaker may be automatically unmuted again responsive to detection of an occurrence of unmuting condition such removal of the object from the monitored vicinity to a sufficient degree according to a selected criterion. For example, the proximity sensor(s) may be calibrated or the analysis logic of their output signals adapted so as to react on close enough and/or large enough object such as hand or arm of the user only.

Preferably, further responsive to detecting the obstacle that advantageously causes muting the speaker, a number of notification signals are transmitted via the communication interface to the terminal. A notification signal may indicate a muting or unmuting condition of the speaker. A notification signal of the first type preferably triggers storing of audio signal received from the remote end of communication session at the terminal. A notification signal or other indication of the unmuting condition then preferably triggers the transfer of the stored audio signal to the accessory for audible reproduction via the speaker. Thus the terminal may dynamically buffer the incoming remote audio signals during the muting condition of the speaker of the accessory to enable delayed reproduction thereof at a later instant.

The terminal may be configured to reduce or cancel such buffering when the audio data existing therein has been already provided to the accessory.

In general, a buffer size/length may be dynamically expanded according to a selected buffering scheme in case the muting condition continues.

The notification signals could additionally or alternatively cause execution of other actions at the terminal. For example, the integral speaker of the terminal could be muted/unmuted accordingly.

It is easy to contemplate by a person skilled in the art based on the foregoing that the suggested muting functionality associated with the speaker may be utilized in isolation from the muting functionality of the transmitted locally captured (uplink) sound, whereupon an accessory implementing only one of these two muting functionalities could be provided instead of more versatile aggregate device supporting these both advantageous features.

According to one aspect, a communications terminal comprises a network interface, such as a cellular, other wireless and/or local area network (LAN), optionally wireless local area network (LAN), compatible transceiver, for transferring audio signals and thus enabling a local user to communicate using voice (speech) with at least one remote user via a network, such as the cellular network and/or the Internet, a communication interface, such as auxiliary/peripheral, possibly a short-distance wireless and further optionally specifically Bluetooth and/or Bluetooth Low Energy compliant transceiver or other wireless transceiver, or a wired transceiver with a selected connector, for communicating with an accessory, such as an RSM or a speakerphone, operable by a local user of the terminal, a memory for storing data such as digital audio signals, and processing circuitry, such as at least one microprocessor, signal processor or microcontroller, configured to at least temporarily store audio signal received from a remote user via the network interface in said memory responsive to the receipt of a predefined notification signal, optionally PTT signal, from the accessory and preferably provide the stored audio signal to the accessory for delayed audible reproduction via the communication interface following a detection of a fulfillment of a predefined forwarding condition such as receipt or absence of the same or other predefined notification signal from the accessory.

In various embodiments, the receipt of the notification signal indicative of muting activity at the accessory may thus trigger switching into storing the received audio data locally at the terminal instead of substantially immediately forwarding it to the accessory for reproduction via its speaker and/or reproducing it via the integral speaker of the terminal.

As the forwarding condition is subsequently detected, which may refer to receiving of other notification signal that indicates the end of muting period, the stored (buffered) audio data may be provided to the accessory for audible reproduction via the speaker. Alternatively or additionally, the reproduction could take place via the integral speaker of the terminal.

In certain further aspects, different embodiments of methods for execution by the accessory and the communications terminal are considered. These aspects are more thoroughly discussed in the following detailed description and claims appended herewith.

The utility of the present invention arises from a plurality of issues depending on each particular embodiment thereof.

The suggested active, default mode, muting of uplink audio already at the accessory device operated by a user of an associated terminal helps to assure that undesired ambient noises or other secondary sounds do not end up in the uplink communication path and therefore ultimately in the ears of the remote participants via remote terminals in their possession, while the full duplex basic nature of the communication session, which may refer to a circuit switched or packet switched one-on-one or conference call, for instance, may still be preserved with its obvious benefits such as possibility to transmit audio data without additional delay arising from classic half-duplex PTT channel reservation or sniffing procedures also suffering from potential collisions and related re-attempts, not forgetting the awkward and delay-introducing standard muting/muting functionalities of different existing communication applications running on e.g. laptops, desktop computers, tablets or smartphone platforms.

The transmission of uplink audio may in connection with various embodiments of the present invention be indeed selectively, accurately, rapidly and conveniently controlled by the user e.g. via the PTT type switch of the RSM or other feasible accessory such as a speakerphone. The effect of switch actuation may be configured as practically instant as there is no technical need to wait for transmission turn, channel sniffing (listening) results, etc. The very same accessory may still be cleverly used upon need for real half-duplex communication where the PTT switch is actuated for really requesting or reserving transmission permission and associated temporary control over the related transmission resources.

The suggested solution suits well in use scenarios with high level of stationary or varying background noise or other sounds not meant for transmission to the remote parties. These scenarios incorporate e.g. different outdoor uses, industrial environments, professional use (law enforcement, security, emergency), etc. Yet, general intelligibility of communication is improved whereas communication fatigue is reduced.

Yet, the solution applies e.g. to different conference calls as there is usually in any case only one speaker active at a time while without the present invention, the remaining participants could just capture and introduce a variety of annoying and disturbing background noises to the overall sound scheme perceived by the participants.

In some embodiments of the present invention, the audio reproduction via the speaker of the accessory and optionally of the terminal (integral speaker) may be rapidly interrupted by applying proximity detection or similar arrangement for detecting a very natural and intuitive, rapid gesture of blocking the sound output from the speaker with some available object, most commonly being the hand of the user when the audio output disturbs some ongoing other activity such as listening or talking activity not necessarily relating to the terminal-based communication session at all. The gesture detection could also be included in the terminal itself to mute local speaker or remote speaker via associated signaling.

Together with the muting of the speaker, the detected gesture may be configured to trigger, via associated signaling, buffering of downlink audio in the terminal so that after muting, the audio signals received in the meantime are still available for reproduction as they can be fetched from the buffer, and thus the related potentially valuable information is not lost as only its reproduction is delayed.

Gesture detection could be further used for providing other control input than merely muting, or, instead of or in addition to muting the speaker by gestures, e.g. PTT switch (control) functionality could be implemented accordingly.

Haptic feedback based on e.g. incorporation of at least piezo actuator or other vibration element in the accessory may be conveniently utilized to notify the user regarding e.g. the status of the accessory, terminal apparatus, receipt of user input or other data, etc.

Further benefits of the embodiments of the present invention will become evident to a person skilled in the art based on the detailed description below.

The expression "a number of" may herein refer to any positive integer starting from one (1).

The expression "a plurality of" may refer to any positive integer starting from two (2), respectively.

The verb "to comprise" is used in this document as an open limitation that neither requires nor excludes the existence of also unrecited features.

The expression "data transfer" may refer to transmitting data, receiving data, or both, depending on the role(s) of a particular entity under analysis relative a data transfer action, i.e. a role of a sender, a role of a recipient, or both. Similarly, the term "communicate" may herein refer to transmitting, receiving, or both transfer directions.

The terms "a" and "an" do not denote a limitation of quantity, but denote the presence of at least one of the referenced item.

The terms "first" and "second" do not denote any order, quantity, or importance, but rather are used to distinguish one element from another.

Different embodiments of the present invention are disclosed in the attached dependent claims.

BRIEF REVIEW OF THE DRAWINGS

Different embodiments of the present invention are next described in more detail with reference to the appended figures, in which FIG. 1 depicts selected major concepts of the present invention via few embodiments thereof and a related potential use scenario.

DETAILED DESCRIPTION

Figure 1:
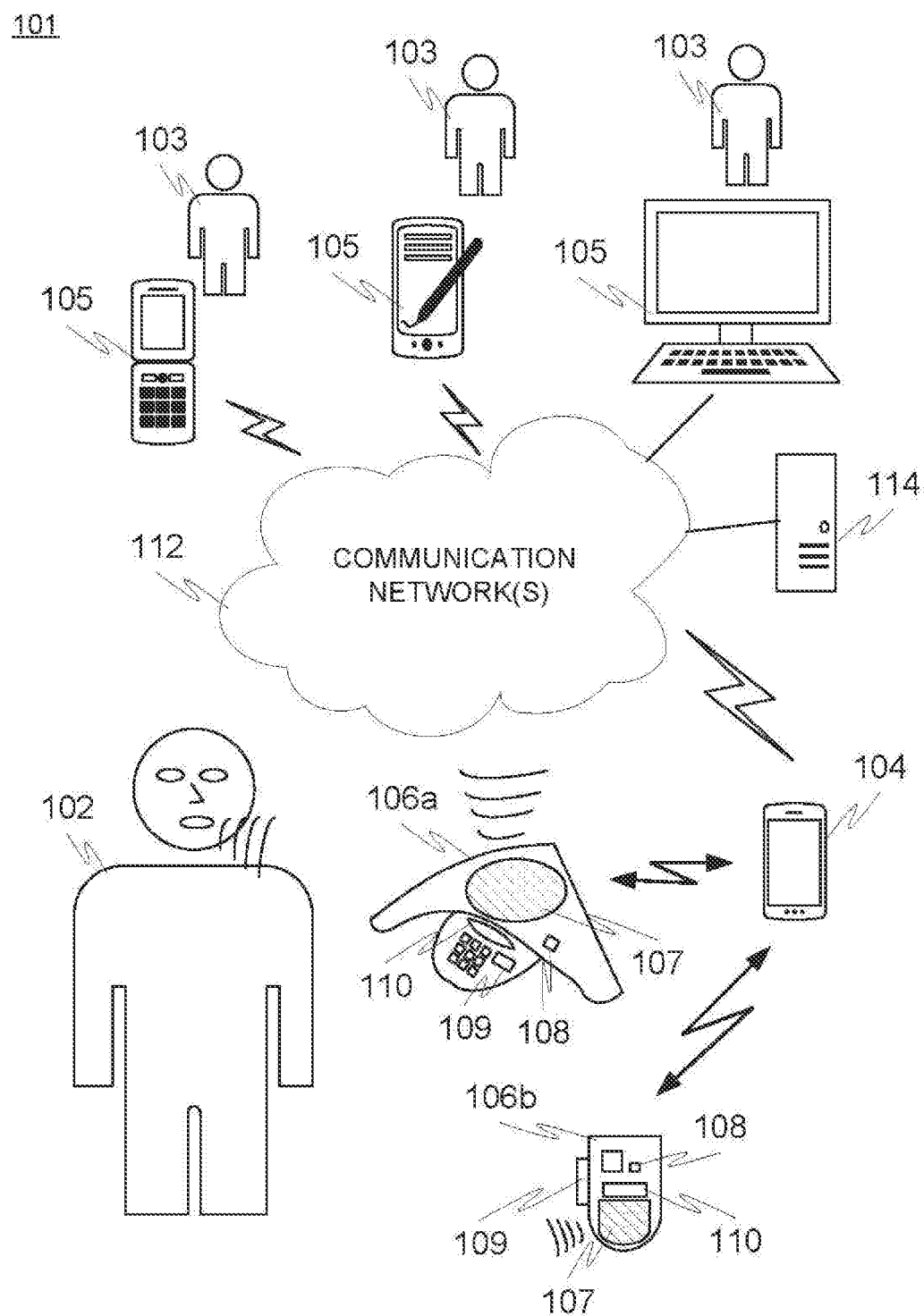

FIG. 1 illustrates (not in scale for clarity reasons), at 101, one possible use scenario for various embodiments of the present invention.

The local user 102 and preferably one or more remote users 103 may be provided with an embodiment of a terminal 104, 105 and/or accessory 106a, 106b in accordance with the present invention. Alternatively, the terminals 105 of the remote users 103 could be 'ordinary' in a sense that they do not implement any or all novel features suggested herein. Correspondingly, the remote users 103 may or may not have an embodiment of the accessory 106a, 106b on hand.

The communications terminal 104, 105 may refer to at least one element selected from the group consisting of: mobile terminal, cellular phone, smartphone, tablet, phablet, communications-enabled PDA (personal digital assistant), laptop computer, desktop computer, wearable computer, wristop computer, vehicle-based or -integrated terminal, in-vehicle (usually integral) terminal, and vehicle dashboard-integrated terminal.

The accessory 106a, 106b may refer to at least one typically electric and preferably specifically electronic apparatus selected from the group consisting of: RSM (remote speaker microphone, depicted at 106b), speakerphone (depicted at 106a), headset, tabletop accessory, portable accessory, wearable accessory, remote UI (user interface) device, and hand-held accessory.

The terminals 104, 105 may mutually communicate via a number or communications networks such as cellular networks, computer networks (e.g. the Internet), related elements such as servers 114 (e.g. communication service server) or gateways, and/or in some embodiments potentially also directly or via an intermediary device such as a repeater.

For the purpose, the terminals 104, 105 preferably contain communication interface, preferably a network interface such as a cellular transceiver or e.g. a local area network (LAN) adapter that may be wired or wireless (WLAN). A single terminal 104, 105 may naturally support a plurality of communication technologies and related connections.

The accessory 106a, 106b preferably contains a mic (rophone) 108 for capturing audio input such as voice, typically speech, input by the corresponding user 102. Yet, the accessory 106a, 106b comprises a communication interface, preferably a wireless one (e.g. Bluetooth-based such as Bluetooth Classic™ and/or Bluetooth Low Energy, BLE™) but a wired connection with preferred wired transceiver and proper connector may be additionally or alternatively applied. Further, the accessory 106a, 106b incorporates a user input or control input feature 109, implementing herein essentially a PTT (push-to-talk) switch, which enables controlling audio muting in uplink direction dynamically.

In preferred embodiments, even though the applied communication method may involve full-duplex communication connection between the participants, the uplink audio transmitted by the accessory 106a, 106b of the terminal 104 and provided towards the remote terminals 105 and their users 103 is by default muted. Muting may be implemented, for example, by manipulating the audio signal, which may be in the form of encoded audio frames established based on the microphone signal, such that the resulting volume or level of the signal is substantially zero or at least very low if interpreted correctly e.g. at the remote end 105 by a compatible decoder, for example. The muted frames may thus refer to ordinary audio frames with zero/low sound output volume/level indicating parameters or more special 'silence' frames, depending on the embodiment and used audio coding/communication technology.

Generally, muting may be momentarily turned off by the actuation of the PTT switch 109 by the user 102 to input voice/speech signal for capturing by the microphone 108 to yield unmuted uplink audio signal for distribution to the remote terminals 105 and for finally local audible reproduction thereat to the users 103.

The benefits of this approach have been already discussed hereinbefore. For example, various undesired background noises otherwise automatically captured by the microphone 108 and provided forward in uplink direction via the terminal 104 in typical full-duplex communication schemes may be filtered out, whereupon the conversation among the users 102, 103 remains noise-free.

In the same or different embodiment of the accessory 106a, 106b, at least one sensor 110 capable of detecting an obstacle in the vicinity, e.g. in the front, of a speaker 107 is provided. The sensor signal may be used to determine whether e.g. the user 102 is trying to block the sound of the speaker 107 with his/her hand or arm, or some other part. If this seems to be the case (e.g. the sensor signal indicates that there's a sufficiently close, static and/or large object in front of the speaker 107 according to a selected criterion/plurality of criteria), the speaker output may be temporarily muted. There may also be some additional or alternative muting conditions in use depending on the embodiment.

The utilized sensor technology may be selected case specifically as being understood by a person skilled in the art depending on e.g. the obstacles (e.g. material, distance, size, etc.) to be detected. The sensing or detection logic may be adaptive. The sensor 110 may optionally include at least one element selected from the group consisting of: proximity sensor, ultrasonic sensor, infrared sensor, inductive sensor, capacitive sensor, optical sensor, laser sensor, radar, lidar (light detection and ranging), and magnetic sensor.

As explained hereinbefore, the user 102 may have something important to do locally, involving e.g. hearing and/or speaking activities, whereupon he/she is willing to temporarily turn the speaker off. By the suggested solution, such temporary muting becomes very natural and intuitive.

Muting may be ended when a fulfillment of unmuting condition is detected. Typically that is also related to the sensor signal. For example, when the removal of the obstacle is detected according to the selected criterion, unmute may take place after which the speaker functions normally and thus typically reproduces e.g. downlink audio signals potentially incorporating speech originating from remote parties 103 and terminals 105.

In connection with muting, the accessory 106a, 106b may signal to the terminal 104 about the changed mute status (on/off) using predefined notification message(s).

Based on the nature of the notification, the terminal 104 may be configured to start buffering the downlink audio, potentially instead of or in addition to delivering it to the accessory 106a, 106b. This may typically take place responsive to a notification indicative of the beginning of mute condition at the accessory 106a, 106b.

E.g. after the mute condition has ended based on the signaling provided by the accessory 106a, 106b, the terminal 104 may be configured to automatically or responsive to explicit user control action provide the stored (buffered) audio signal(s) to the accessory 106a, 106b or some other element such as a server 114, preferably oldest data first. In some embodiments, the stored signal(s) residing in the established buffer may be additionally or alternatively reproduced locally by the terminal 104, e.g. via an integral speaker thereof.

Therefore, no important audio messages are eventually lost from the standpoint of the user 102 even if the speaker 107 is temporarily muted for some reason.

In some embodiments, instead of terminal 104 buffering/storing the downlink audio signals during muting, the terminal 104 may notify a network element such as the communication server 114 about the situation so that the server 114 may buffer the audio for later use. The terminal 104 may further inform about the termination of the muting period, whereupon the server 114 may stop buffering, provide the buffered audio forward in downlink direction towards the terminal 104 and accessory 106a, 106b and/or store the buffered audio, at least for the time being or permanently, for later use.

Figure 2:
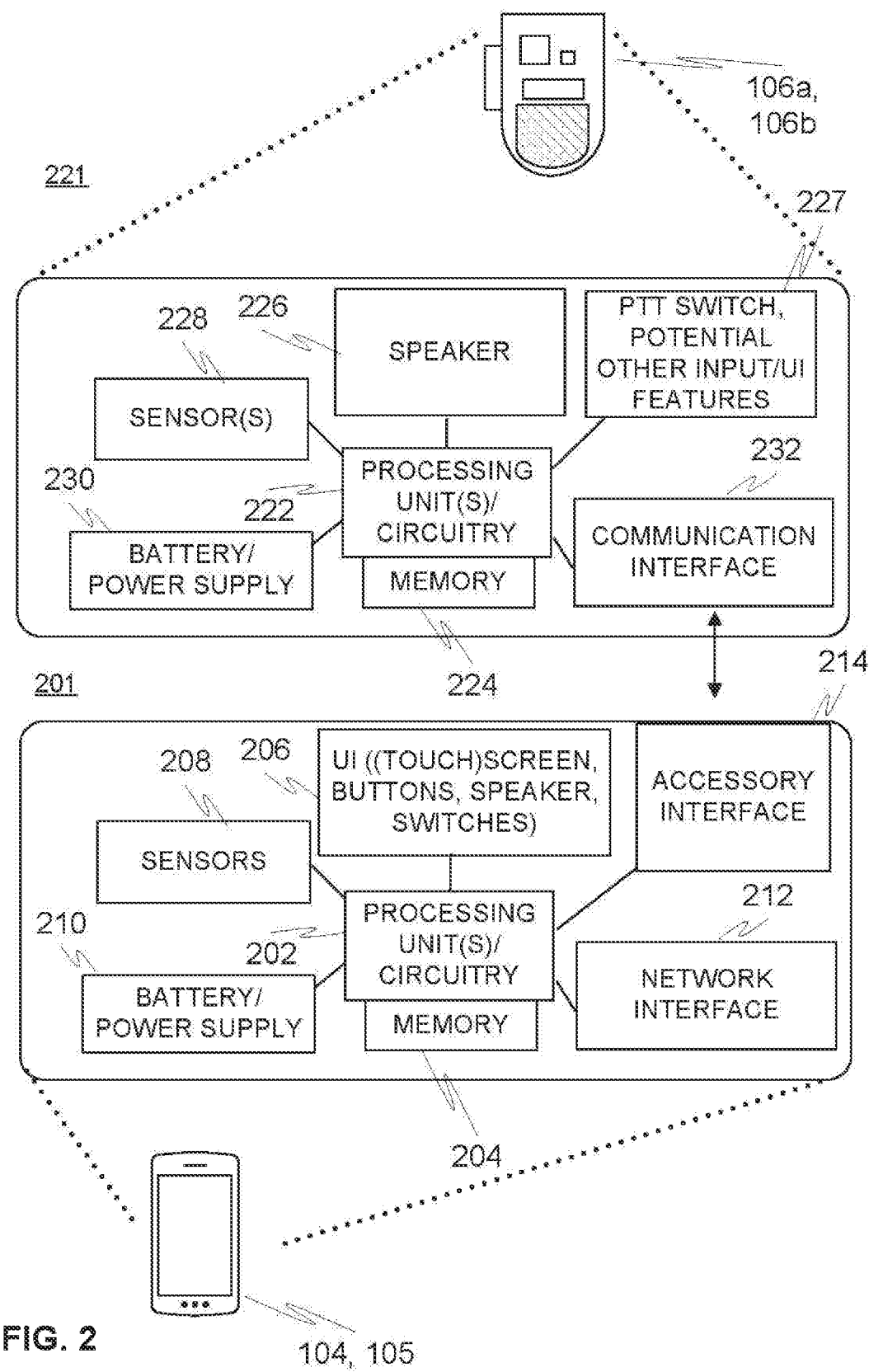
FIG. 2 is a block diagram of the accessory and terminal devices in accordance with respective two embodiments of the present invention.

FIG. 2 is merely an exemplary block diagram highlighting few selected, possible internal elements of various embodiments of the terminal 104, 105 (at 201) and accessory device 106a, 106b (at 221).

Electrical and preferably specifically electronic control circuitry 202, 222 is provided. The circuitry 202, 222 may include a processing means with reference to a number of e.g. integrated circuit type processing units such as microprocessors, microcontrollers, signal processors, ASICs (application-specific integrated circuit), programmable logic chips, etc. that may be at least functionally connected to each other. Control logic for the circuitry may be stored as software instructions e.g. in the form of program(s), application(s), etc. Physical storage medium 204, 224 for storing e.g. the instructions and/or other data such as audio signal data may include a number of memory chips, for instance, possibly integrated with the processing/control circuitry 202, 222.

The control circuitry 202, 222 may be configured to manage, e.g. in accordance with the instructions stored in memory 204, 224, different operations taking place in the host device. In the case of the terminal 104, 105, the circuitry 202 may, for instance, control audio buffering and forwarding responsive to the notification signals from the accessory 106a, 106b and/or to other triggering condition(s) applied. In the case of the accessory 106a, 106b, the circuitry 222 may mute the uplink audio data/signal responsive to the state of the PTT switch, for example. Yet, the muting status of the speaker 226 may be controlled by the circuitry 222.

Battery/power supply 210, 230 is required to power the electronics. For example, rechargeable battery, optionally of LiPo, LiFe, Li-Ion, Ni-MH or Ni—Cd type, may be utilized in portable applications. In some embodiments the item 210, 230 may alternatively or additionally refer to a connector or cable for connecting to an external power supply such as the mains.

A number of sensors 208, 228 may be included. For example, at least one proximity sensor or a sensor array may be provided and used in the accessory 106a, 106b to detect obstacles such as a hand, finger, or arm of a user relative to a target volume (3d-space) or region/area monitored preferably upon the speaker 226. Also the terminal 104, 105 may include proximity sensor(s) to detect obstacles and to act accordingly, which may include muting the integral speaker and/or provision of muted audio signals (or no signals at all) to the accessory 106a, 106b. The sensors 208, 228 may be further considered to comprise the necessary microphone(s) 108 for capturing speech or other sound input.

In some embodiments, gesture input, which may include contactless input, may be detected and captured by at least one sensor 208, 228 to control the PTT function and thereby to act as an element of the PTT switch(ing) feature 227. For example, detected movement of an object such as the user's hand, finger, or arm in predefined direction or according to predefined pattern may be translated into user intent to provide voice input and thus mic mute override action, whereas some other motion could be optionally exploited for ending the mic mute override (and thus causing reverting to mute status). Yet, a timer-based solution could be applied for reverting to mute status automatically after override. In addition to or instead of PTT control, other control input could be provided by contactless (proximity) or tactile user input such as gesture input.

For example, commands (control signals) targeted to the accessory 106a, 106b, or apparatus 104, 105, or an application running therein, could be provided responsive to detecting corresponding user input associated with the commands. The associations could be of preset type and/or user-configurable through a training or mapping procedure, for example, during which a user provides a certain input and indicates to the accessory 106a, 106b or apparatus 104, 105, via the available UI, a preferred response (activation or termination of a device feature, activation or termination of application, sending a control signal, etc.). Even voice or speech recognition feature available e.g. at the apparatus 104, 105 could be triggered by the gesture input. The accessory 106a, 106b may be configured to detect and translate a gesture into an associated control signal provided to the apparatus 104, 105 for performing a related response such as activation, termination or other control action over application, application feature or generally device feature.

The apparatuses 104, 105, 106a, 106b may include a number of different UI features, such as integral speaker(s) 206, 226 and/or earphones, headphones or at least a connector therefor (or generally for an external loudspeaker) to provide audio output such as reproduction of remotely received downlink audio signals or locally generated informative beeps, for instance. PTT and/or other type of user (control) input features 206, 227 may be provided. They may be tactile and/or contactless, for example.

The UI 206, 227 of any or all apparatuses 104, 105, 106a, 106b may include a tactile feedback element such as vibration feedback providing element with reference to e.g. a vibration motor, or more preferably, a piezo actuator such as a linear piezo actuator. The piezo actuator may be in many occasions preferred due to its silent action, which may be crucial e.g. in different security applications wherein louder vibration motors may turn out problematic. The piezo actuators are usually compact in size, light, support wide frequency ranges and have fast response time to input. The tactile feedback element may be configured to notify a user about a predefined event, e.g. capture of user input such as gesture input for speaker control, PTT control and/or other purposes. The type of the notification/feedback (e.g. vibration pulse sequence and/or length) may depend on and characterize the nature of the detected input. A tactile and/or gesture UI may be therefore implemented in terms of related user input and/or feedback (to the user).

Touch display technology may provide versatile input and output means to the user even though just one or more status lights, simple LCD and/or few switches such as push buttons may suffice especially on an accessory type device 106a, 106b.

To communicate with external elements a number of communication interfaces 212, 214, 232 may be provided to each device 106a, 106b, 104, 105. Each interface may support one or more communication technologies.

Preferably the terminal 104, 105 contains at least one interface 214 for communicating with the accessory 106a, 106b, and one interface 212 for communicating with network infrastructure and/or other terminals. In some embodiments, a common interface and/or at least common interface technology in case e.g. separate elements such as connectors are still required, may fit both the purposes reasonably well considering e.g. different available wireless or wired LAN technologies.

Preferably, however, a shorter distance interface such as e.g. Bluetooth-based wireless interface 214, 232 with related transceivers is used for communication between the terminal 104, 105 and accessory 106a, 106b while communication relative to the network takes place via a wireless (e.g. cellular or WLAN) or wired (e.g. LAN, optionally Ethernet) interface 212 that may optionally serve longer distances considering e.g. the range of an ordinary wireless cellular connection with a base station, which may easily be several kilometers or even tens of kilometers.

Having regard to the details of communication between the terminal 104, 105 and the accessory 106a, 106b, an earlier patent application U.S. 62/039,968 (Aug. 21, 2014) discloses many applicable options, whereupon the aforementioned disclosure is incorporated herein by reference in its entirety.

For instance, a first communication technology such as the BLE may be used for the transfer of signaling whereas for audio such as voice (e.g. speech) a second technology such as Classic Bluetooth is applied.

Figure 3:
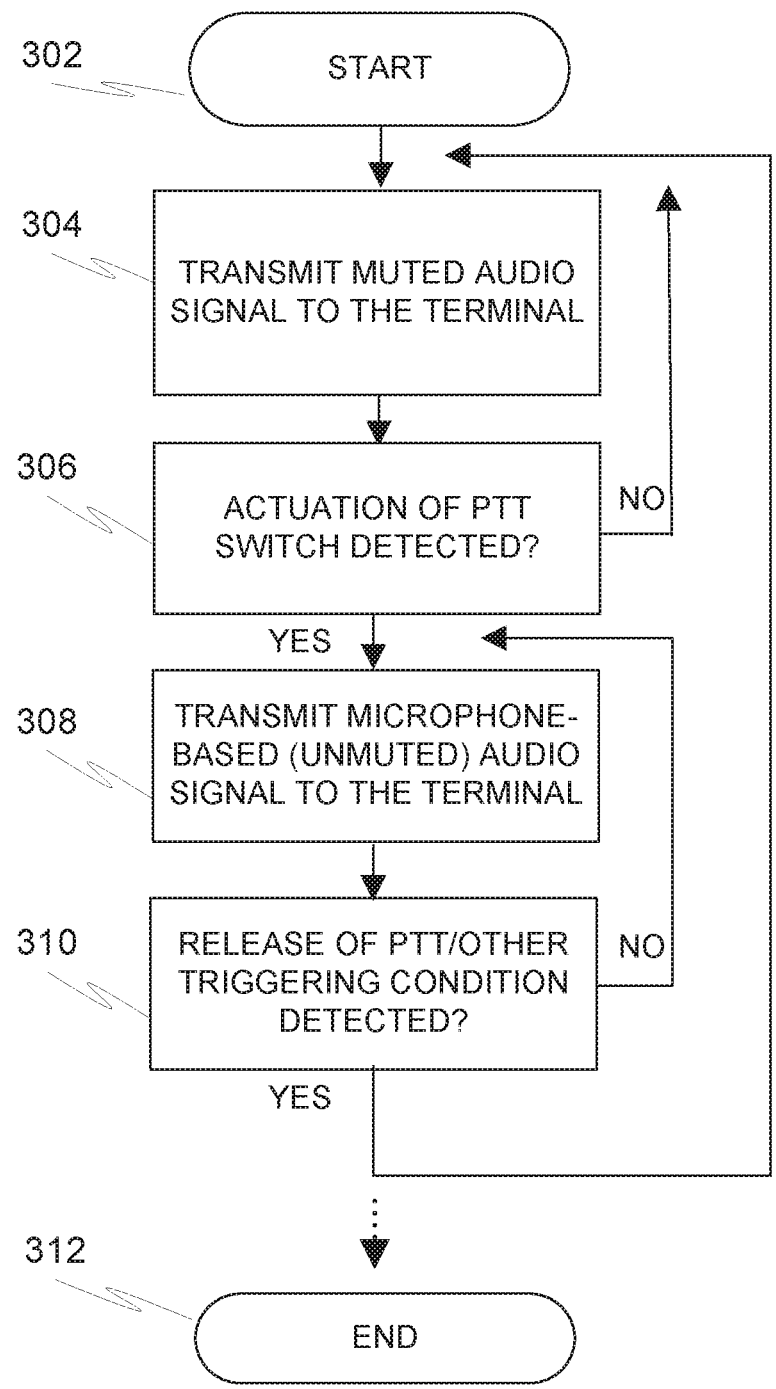
FIG. 3 is a flow chart of a method according to an embodiment of the invention.

FIG. 3 is a flow diagram of an embodiment of a method in accordance with the present invention. The method is to be performed by an embodiment of the accessory device. The shown diagram is a relatively high level one for clarity reasons as various details regarding the associated technical elements and functionalities have been already thoroughly discussed hereinbefore or otherwise clear based on the provided teachings as being appreciated by a person skilled in the art.

At 302, a number of necessary preparatory actions such as acquisition and configuration of an embodiment of the accessory are performed. UI may be configured as desired (if possible) and e.g. sound volume settings initially set. Physical control features such as switches may be mapped to execute desired control actions.

At 304, the accessory provides muted, i.e. silent, audio signals, such as frames in connection with most encoded digital audio schemes, in uplink direction, which here means towards a functionally connected (e.g. wirelessly) terminal device. The muted audio signal may have been constructed (digitalized, processed and/or encoded) based on a captured microphone signal including e.g. speech of the user of the accessory and e.g. related volume/level adaptation thereof. Alternatively, the muted/silent audio signal may be some at least partially predefined special signal constructed not at least substantially relying on the microphone input or signal. The terminal may transmit the audio signals forward towards the end recipients such as other participants of one-on-one or conference call, where the delivery may take place via a number of communication networks as discussed hereinbefore. The intermediate entities such as the terminal and/or various network elements such as servers may optionally process, optionally decode and/or re-encode, the audio data using different supported coding or other processing schemes.

At 306, it is shown that the accessory is configured to monitor user input provided via e.g. PTT switch (e.g. a momentary push button type switch, typically of electrical type, a touch switch with a touch-sensitive sensing surface, or e.g. a contactless (proximity) and/or haptic (touch) gesture, or mere presence, type input detecting sensor or sensor array—utilizing switch). A single accessory may contain and support one or multiple PTT control switch features and technologies such as momentary push button and/or contactless (proximity) gesture sensing. Obviously, the PTT switch may not have to be explicitly called as 'PTT' in the embodiments as long as the function is essentially the same as contemplated herein. Responsive to detecting the actuation of the switch (the user may depress it and hold it depressed for the duration of his/her voice input), which may cause e.g. closing of related electric circuit that is somewhat easy to detect electrically, the mute function is turned off with reference to the shown 'YES' branch, see item 308. Now the uplink audio signal is indeed preferably constructed (digitalized, processed and/or encoded) based on the captured microphone signal including e.g. speech of the user of the accessory without any muting or without at least severe muting (some muting could still occur due to e.g. sound dynamics optimization). Otherwise, the muting operation is continued in accordance with item 304 (upper 'NO' path).

Finally upon noticing a fulfillment of triggering condition(s) to revert to muting at 310, which condition(s) may include the release of the PTT switch by the user and/or e.g. expiration of a timer, the method execution is basically restarted from 304 (lower 'YES' path).

The method execution is ended at 312, which may refer to turning the whole accessory off, ending the communication session, or losing the connection with the terminal, for instance.

Figure 4:
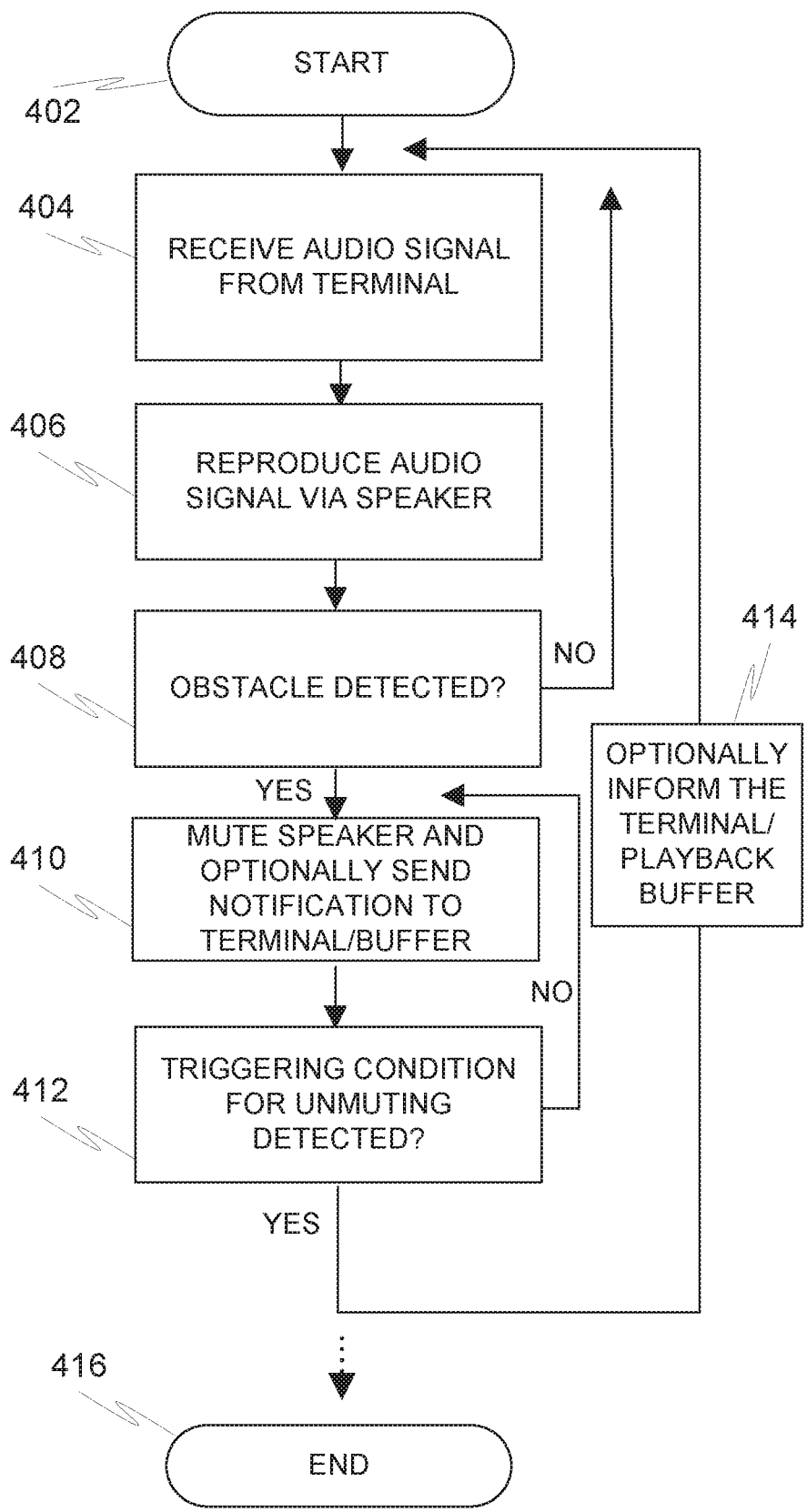
FIG. 4 is a flow chart of a method according to another embodiment of the invention.

FIG. 4 is a flow diagram of an embodiment of a method in accordance with the present invention. The method is to be performed by an embodiment of the accessory device. The same accessory may be also configured to execute the method of FIG. 3, but that is not necessary from the standpoint of the method of FIG. 4. The shown diagram is a relatively high level one for clarity reasons as various details regarding the associated technical elements and functionalities have been already thoroughly discussed hereinbefore or otherwise clear based on the provided teachings as being appreciated by a person skilled in the art.

At 402, a number of necessary preparatory actions such as acquisition and configuration of an embodiment of the accessory may again be performed. UI may be configured as desired (if possible) and e.g. sound volume settings of a speaker initially set. Physical control features such as switches may be mapped to execute desired control actions.

At 404, audio signals e.g. in encoded, digital form are received from a functionally connected terminal, i.e. in downlink direction following the general terminology used herein. The audio signals may represent voice such as speech of remote participants of a communication session such as one-on-one or conference call. Alternatively or additionally, the audio signals could be autonomously generated by the internal logic of the accessory (e.g. various informative beeps or other sounds such as music playback based on e.g. stored music file(s) such as encoded audio files) or received from a number of other sources. In these latter scenarios, the accessory would not have to be connected to any terminal or even incorporate the necessary communication interface. It could be whatever electronic device, such as a music or multimedia player, containing a speaker for sound production, a proximity sensor and the necessary control circuitry.

At 406, the audio signals are audibly reproduced via a (loud)speaker of the accessory, which may involve first decoding the signals and then supplying the audio transducer (speaker) accordingly to generate the actual sound. Preferably the reproduced sound is sufficiently representative (e.g. intelligible) of the originally captured sound such as the speech of a remote participant of the communication session. The adopted speaker and optionally e.g. audio coding or generally processing technology may still vary depending on the desired sound levels, space available, type of the speaker (e.g. free-air speaker vs. earphones), etc. as being understood by a skilled person.

At 408, it is indicated that the accessory is configured to detect obstacles such as the hand of the user upon the speaker (the obstacle may have to substantially contact the speaker or at least hover above it depending on the embodiment) and/or some other monitored location. For the purpose, a proximity sensor, even a sensor array, may be utilized.

If the obstacle is detected ('YES' path) according to a selected criterion and optionally if a number of further necessary potential conditions are fulfilled (e.g. the speaker volume is set high enough), the speaker is muted at 410. For example, the speaker may be served with substantially zero volume driving signal or no signal at all.

Optionally, a notification signal, such as a message of predefined type, is sent to the terminal so that the terminal may act accordingly.

At 412, it is shown that the accessory further monitors the fulfillment of a condition to unmute the speaker ('YES' path). In practice, this condition may be or at least include the removal of the obstacle from the space e.g. in front of or upon the speaker originally considered sufficient to mute the speaker. Otherwise, muting 410 can be continued ('NO').

At 414, it is shown that the terminal may again be informed e.g. by an associated notification signal that the speaker is now unmuted, responsive to which the terminal may supply e.g. sound signals buffered in the meantime to the accessory for reproduction via the speaker. The accessory may handle such sound signals as ordinary sound signals and playback them normally (it may not even differentiate them from non-buffered signals unless provided with e.g. special identifier, which could be used to treat such buffered signals differently by optionally omitting them depending on the settings of the accessory, for instance).

In some embodiments, the accessory could itself buffer, at 410, downlink audio for the duration of speaker muting and playback the audio afterwards at 414. Optionally, if further downlink audio was simultaneously received from the terminal, it could be included in the buffer as well for output after the previously buffered signals. After emptying the buffer, it may bypassed to avoid the related delay.

The method execution is ended at 416 due to the accessory shut-down or termination of communication session or connection with the terminal, for instance.

Still, it shall be mentioned that also the terminal device could generally adopt the solution of FIG. 4 for muting its own speaker. In some embodiments, the notifications by the accessory could be also used to control the muting of the integral speaker of the terminal, thus not just or not at all the afore-explained buffering.

Figure 5:
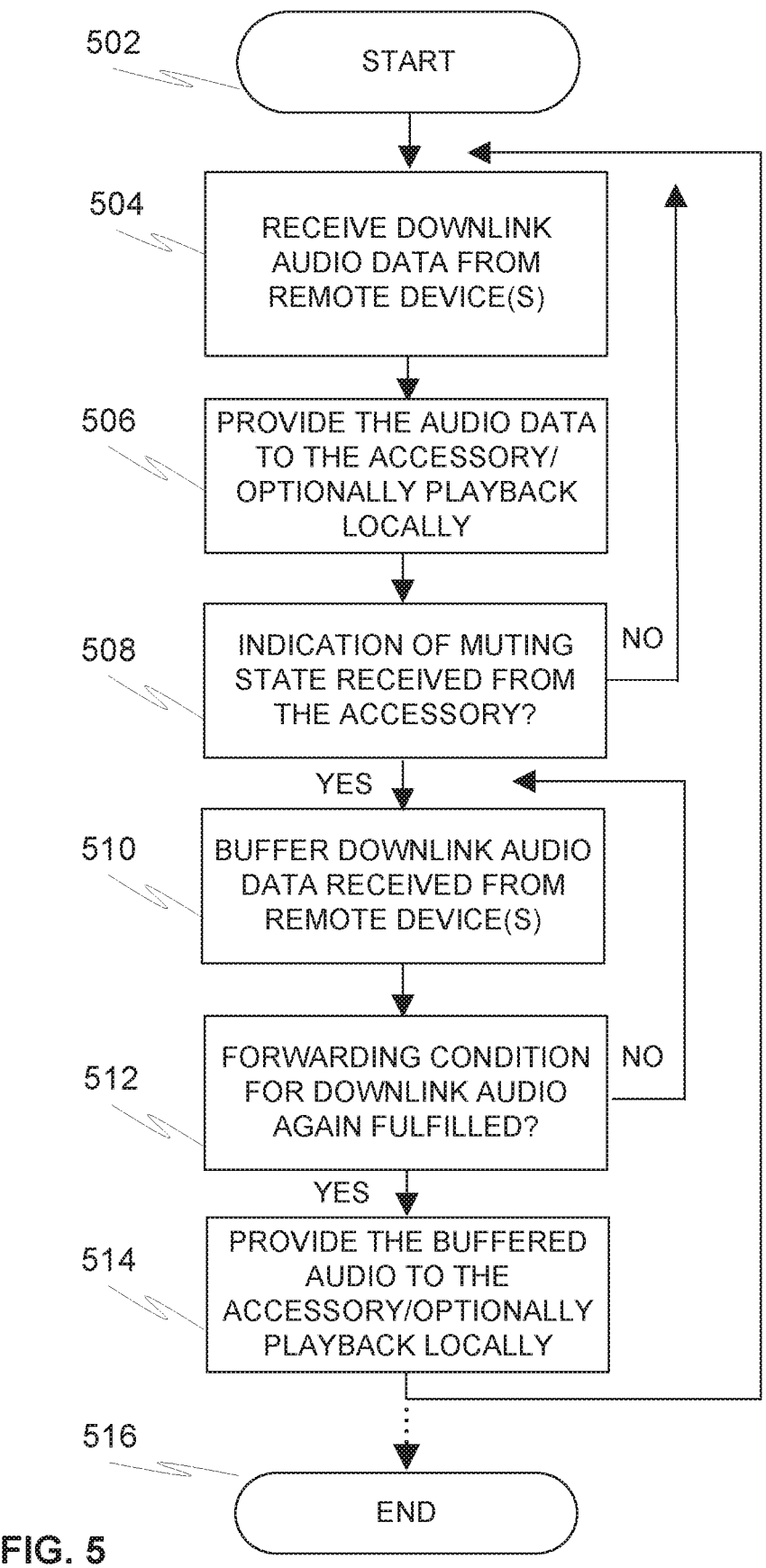
FIG. 5 is a flow chart of a method according to a further embodiment of the invention.

FIG. 5 is a flow diagram of an embodiment of a method in accordance with the present invention. The method is to be performed by an embodiment of the terminal device. The shown diagram is a relatively high level one for clarity reasons as various details regarding the associated technical elements and functionalities have been already thoroughly discussed hereinbefore or otherwise clear based on the provided teachings as being appreciated by a person skilled in the art.

At 502, a number of necessary preparatory actions such as acquisition and configuration of an embodiment of the terminal device, such as cellular or 'smart' phone, may be performed. It may be provided with desired communication software, such as client application of a selected communication service.

At 504, audio signals e.g. in encoded, digital format are received in downlink direction typically over a network as discussed hereinbefore. The audio signals may represent voice such as speech of remote participants of a communication session such as one-on-one or conference call.

At 506, the audio signals are preferably without additional unnecessary delay provided forward to a functionally connected accessory, such as a RSM or speakerphone for reproduction. Optionally, the terminal could reproduce the signals via its integral speaker.

The terminal may optionally decode and/or re-encode, or otherwise process, the signals e.g. prior to distribution to the accessory to meet e.g. the specifications of the accessory what comes to the supported audio formats, for instance.

At 508, it is shown that the terminal is preferably configured to monitor incoming signaling from the accessory. If a notification is received indicative of muting condition of the speaker taking place in the accessory (the terminal may be initially provided e.g. at start-up 502 identification data to properly identify such notifications in the future), item 510 is to be executed ('YES' path). Otherwise ('NO'), the transfer of audio signals continues normally 504 with the detection 506 of signaling arriving from the accessory.

At 510, the terminal buffers (stores) downlink audio in addition to or, more likely, instead of providing it to the accessory. Alternatively or additionally, the terminal could inform a used communication server, optionally through which the communication signals of the session may in some embodiments be delivered, to take care of buffering.

At 512, it is determined whether a condition for forwarding of downlink audio is fulfilled. Typically this happens at the receipt of a predefined indication from the accessory (e.g. a further notification signal) but there may be additional or alternative conditions active as well. For example, a maximum size of the buffer may have been reached. In some embodiments, the buffer size may be changed dynamically (expanded and reduced). There may still be a maximum size set for the purpose, however.

If the one or more necessary conditions have indeed been fulfilled ('YES'), the buffered audio signals are preferably provided to the accessory for audible reproduction at 514. Otherwise ('NO'), buffering 510 is continued.

At 516, the method execution is ended due to e.g. connection lost with network, communication session ended, connection lost with the accessory, terminal shut-down, etc.

The scope is defined by the attached independent claims with appropriate national extensions thereof having regard to the applicability of the doctrine of equivalents.

In some embodiments of the present invention concerning e.g. the accessory device, at least two different switches such as push buttons could be allocated to audio mute activation and deactivation, respectively. Accordingly, the multiple switches could be considered to together form the PTT switch construction in accordance with the present invention.

Instead of or in addition to a PTT switch to be touched, the switch could be based on e.g. the use of contactless sensors such as a number of proximity sensors as deliberated hereinbefore. A certain gesture could be associated with PTT actuation (thus leading at unmuted audio in uplink direction) and another with PTT release (thus leading at muted uplink audio, i.e. the default mode), or e.g. a timer or some other feature could be utilized for triggering the release. One applicable gesture could incorporate e.g. hand or arm swipe in certain direction (e.g. left or right from the standpoint of the sensor), and/or rotation thereof. The used sensor(s) may sense a plurality of directions and/or locations (e.g. up, down, left, right) relative to the sensing surface or volume.

A haptic or specifically tactile feedback or related UI may be provided by means of vibration elements such as piezo (electric) actuators included in the host apparatus such as an embodiment of the accessory or the communications terminal. For example, responsive to detecting gesture and/or PTT related input (contactless or tactile), or receiving data from a remote device, generic or input-specific feedback could be provided to a user to indicate proper detection of the input or receipt of data, respectively.

In some embodiments subsequent, similar actuations of the same switch could toggle between different states such as activation and deactivation of uplink audio mute. A momentary switch, e.g. a depressible button or touch switch, may be still preferred for uplink audio muting as it may not be accidentally left in wrong position. When released or uncontacted, the mute state is automatically activated, optionally after a selected delay.

The invention claimed is:

1. An electronic accessory, for a communications terminal, said accessory comprising:
 a microphone for capturing the voice of a local user operating the accessory;
 a communication interface for transmitting audio signals including signals based on the captured voice to the terminal and also for receiving audio signals therefrom for audible reproduction by the accessory;
 a push-to-talk (PTT) switch, allowing a momentary action by a local user, for detecting the local user's explicit intent to provide voice input that is to be captured and delivered to one or more remote participants of an ongoing full duplex type communication session via the terminal; and
 a control circuitry configured to keep the outgoing transmitted audio signal muted by default until responsive to the actuation of the PTT switch by the local user said muting is temporarily overridden and the transfer of audio signal indicative of the captured voice signal of the local user is thereby enabled, and responsive to a subsequent release of the PTT switch or detection of an occurrence of other predefined triggering event by the local user, the muting function is reactivated back to the state of muted by default for the outgoing transmitted audio signal, wherein the PTT switch is actuated and released via contactless gesture sensing, or via haptic gesturing or switching enabled by a touch-sensitive sensing surface, while the communication session remains in full duplex type all the time, wherein a speaker is configured to output sound including reproduced voice signals of said one or more remote participants based on audio signals received via the terminal over the communication interface, and at least one proximity sensor to detect an obstacle in a monitored volume preferably upon the speaker, responsive to which the control circuitry is configured to substantially mute the speaker.

2. The accessory of claim 1, wherein muting incorporates transmitting a substantially silence indicating audio signal via the communication interface.

3. The accessory of claim 1, wherein the control circuitry is configured to unmute the speaker responsive to detection of an occurrence of unmuting condition such removal of the object from the monitored volume to a sufficient degree according to a selected criterion.

4. The accessory of claim 1, wherein further responsive to detecting the obstacle, the accessory is configured to issue a notification signal via the communication interface to the terminal indicative of muting condition of the speaker, preferably to trigger storing of audio signal received from the remote end of the ongoing communication session during the muting condition of the speaker thereat and optionally to further indicate to the terminal the end of the muting condition to trigger delayed transfer of the stored audio signal therefrom to the accessory for audible reproduction via the speaker.

5. The accessory of claim 1, comprising at least one sensor, configured to capture gesture input from the local user and translate the gesture input to push-to-talk (PTT), optionally mute override, or other control signal associated with the detected gesture, wherein the signal is optionally indicated to the terminal device.

6. The accessory of claim 1, comprising a vibration element, preferably a piezo actuator, configured to provide haptic feedback to the local user responsive to an event, optionally upon receipt of user input or data via the communication interface.

7. The accessory of claim 5, wherein the sensor is a proximity or haptic sensor.

8. The accessory of claim 1, wherein the electronic accessory is an RSM (remote speaker microphone) or a speakerphone.

9. An accessory comprising a communication interface, such as Bluetooth™ and/or Bluetooth Low Energy™ compliant interface, for receiving audio signals from a terminal device for audible reproduction, a speaker configured to output sound preferably including the received audio signals, at least one proximity sensor to detect an obstacle in the monitored volume external to the accessory, and control circuitry that is configured, responsive to the detection of the obstacle, to substantially mute the speaker preferably until a predefined unmute condition such as removal of the obstacle is detected.

10. The accessory of claim 9, comprising at least one sensor, configured to capture gesture input from a local user and translate a gesture input to push-to-talk (PTT), optionally mute override, or other control signal associated with a detected gesture, wherein the signal is optionally indicated to the terminal device.

11. The accessory of claim 9, comprising a vibration element, preferably a piezo actuator, configured to provide haptic feedback to a local user responsive to an event, optionally upon receipt of user input or data via the communication interface.

12. The accessory of claim 10, wherein the sensor is a proximity or haptic sensor.

13. A method for dynamically controlling muting of outbound audio signal in a microphone-containing accessory device functionally coupled to a communications terminal, comprising:
providing muted audio signal towards the terminal, detecting actuation of a PTT (push-to-talk) switch, allowing a momentary action by a local user;
overriding the muting and providing audio signal based on and indicative of a voice signal captured via the microphone towards the terminal; and
responsive to a subsequent release of the PTT switch or detection of an occurrence of other predefined triggering event by the local user, reactivating the muting function back to the state of muted by default for the outgoing transmitted audio signal, wherein the PTT switch is actuated and released via contactless gesture sensing, or via haptic gesturing or switching enabled by a touch-sensitive sensing surface, while the communication session remains in full duplex type all the time, wherein a speaker is configured to output sound including reproduced voice signals of one or more remote participants based on audio signals received via the terminal over a communication interface, and at least one proximity sensor to detect an obstacle in a monitored volume preferably upon the speaker, responsive to which a control circuitry is configured to substantially mute the speaker.

14. A method for dynamically muting a speaker of an accessory device functionally coupled to a communications terminal, comprising preferably receiving, at the accessory device, audio signals from a functionally connected terminal device for audible reproduction, reproducing audio, preferably the received audio signals, via the speaker, detecting, preferably using a proximity sensor, an obstacle, such as hand, finger or arm of a user of the accessory device, in a monitored volume preferably close to the speaker, and responsive to the detection of the obstacle, substantially muting the speaker output preferably until a predefined unmute condition such as removal of the obstacle is detected.

* * * * *